United States Patent [19]

Munsch

[11] Patent Number: 5,466,322
[45] Date of Patent: Nov. 14, 1995

[54] METHOD FOR MAKING AN ELONGATED PLASTIC MEMBER ASSEMBLY

[75] Inventor: John M. Munsch, Libertyville, Ill.

[73] Assignee: Baxter International Inc., Deerfield, Ill.

[21] Appl. No.: 299,800

[22] Filed: Sep. 1, 1994

Related U.S. Application Data

[63] Continuation of Ser. No. 13,447, Feb. 4, 1993, abandoned.

[51] Int. Cl.⁶ .......................... B29C 65/00; B29C 65/04
[52] U.S. Cl. ...................... 156/273.3; 156/272.2; 156/273.5; 156/273.7; 156/275.1; 156/290; 156/296; 156/245; 156/308.4
[58] Field of Search ...................... 156/296, 290, 156/272.2, 308.4, 309.6, 305, 292, 245, 242, 273.5, 273.3, 275.1

[56] References Cited

U.S. PATENT DOCUMENTS

| | | | |
|---|---|---|---|
| 2,433,546 | 12/1947 | Cornelius | 156/296 X |
| 2,457,498 | 12/1948 | Russell et al. | |
| 2,679,469 | 5/1954 | Bedford | |
| 2,816,596 | 12/1957 | Welch, Jr. | |
| 3,312,579 | 4/1967 | Heifetz | 156/305 |
| 3,322,590 | 5/1967 | Clark | |
| 3,329,271 | 7/1967 | Ward et al. | 156/296 X |
| 3,537,935 | 11/1970 | Withers | 156/296 X |
| 3,558,397 | 1/1971 | Clark | 156/290 X |
| 3,580,764 | 5/1971 | Gerlach et al. | 156/296 X |
| 3,706,620 | 12/1972 | Dykstra | |
| 3,802,987 | 4/1974 | Noll | |
| 3,870,579 | 4/1975 | Uncapher | |
| 4,072,146 | 2/1978 | Howes | |
| 4,263,808 | 4/1981 | Bellotti et al. | |
| 4,276,333 | 6/1981 | Cobean | 156/305 X |
| 4,326,902 | 4/1982 | Peddie | 156/290 X |
| 4,389,267 | 6/1983 | Denslow | |
| 4,436,620 | 3/1984 | Bellotti et al. | |
| 4,486,253 | 12/1984 | Gonia | 156/305 X |
| 4,555,293 | 11/1985 | French | |
| 4,576,671 | 3/1986 | Shimanaka | 156/272.2 X |
| 4,605,397 | 8/1986 | Ligon et al. | |
| 4,900,389 | 2/1990 | Schnell et al. | |
| 5,036,891 | 8/1991 | Vogelsang | |
| 5,049,224 | 9/1991 | Umezawa et al. | |
| 5,073,314 | 12/1991 | Coutandin | |

FOREIGN PATENT DOCUMENTS

| | | | |
|---|---|---|---|
| 2054807 | 4/1971 | France | |
| 3614339 | 10/1987 | Germany | 156/296 |
| 59-42921 | 3/1984 | Japan | |
| 59-42920 | 3/1984 | Japan | |
| 59-178214 | 10/1984 | Japan | |
| 60-4030 | 1/1985 | Japan | |
| 1497204 | 1/1978 | United Kingdom | 156/296 |
| 9208978 | 5/1993 | WIPO | |

*Primary Examiner*—Jeff H. Aftergut
*Attorney, Agent, or Firm*—Thomas S. Borecki; Charles R. Mattenson; Richard P. Beem

[57] ABSTRACT

A method of making a peelable tube assembly (76,80,84,88) having a plurality of adjacent tube portions (62) joined by intermittent breakable webs (72) of plastic allowing the individual portions (62) to be peeled from the tube assembly, including providing a plurality of plastic tube portions (62) each having a tube wall (66) defining a flow passage (70). The tube portions (62) are aligned adjacent to one another in a die assembly (12) having compression channels (30). Narrow confined flow chambers (32) are defined between adjacent portions (62) of the tube walls (66), and between the ends of the tube walls (66). The tube portions (62) are radially compressed without occluding the flow passage (70). Small compressed portions of the tube walls (66) proximate the flow chambers (32) are heated and plasticized. The plasticized tube walls portions (66) are flowed into the flow chambers (32) between the adjacent tube portions (62) to fuse the adjacent tube portions (62) together with intermittent webs (72) joining the tubular portions (62) until the webs (72) are broken when peeling a tubular portion (62) from the tube assembly (76,80,84,88).

11 Claims, 3 Drawing Sheets

METHOD FOR MAKING AN ELONGATED PLASTIC MEMBER ASSEMBLY

This application is a continuation, of application Ser. No. 08/013,447 filed Feb. 4, 1993, now abandoned.

BACKGROUND OF THE INVENTION

1. Technical Field

The present invention is directed toward elongate plastic member assemblies and, more particularly, toward a peelable assembly of a plurality of intravascular tubes or plastic coated wires, a method of making the assemblies and an apparatus for making the assemblies.

2. Background Art

A variety of intravascular tube assemblies are known in the art. One such assembly consists of a number of elongate plastic tubes arranged in parallel, the tubes being joined to adjacent tubes along their entire length by an integral web of the plastic tube material. One such structure is disclosed in Hilderbrandt, U.S. Pat. No. 3,836,415.

Prior art tube assemblies are typically formed through integral extrusion. Integral extrusion, however, has several limitations. Most significantly, integral extrusion has proven to be a relatively expensive procedure. In addition, integral extrusion limits the shapes the tube assembly can take. For example, it is not possible to integrally extrude a coil tube assembly with individual coils of the assembly joined to adjacent coils. In addition, it is very difficult, if not commercially impractical, to join adjacent tubes at intervals along their length by conventional integral extrusion techniques.

One alternative method to integral extrusion for joining adjacent tubes in a tube assembly known in the prior art is the use of a plastic solvent which softens and melts an exterior peripheral surface of adjacent tubes. After application of the solvent, the tubes are placed in their desired adjacent positions, and upon evaporation of the solvent, a fluid resistant bond is formed between adjacent tubes. This process has two advantages over extrusion. First, it provides a method for joining tubes into an assembly at intervals along their lengths, as opposed to continuously. Second, the solvent process permits formation of tube assemblies such as coils. The use of solvents, however, is not without serious disadvantages. The solvents tend to emit noxious fumes which are dangerous to assembly workers. Also, the use of solvents creates hazardous waste disposal problems. The application of the solvents must be closely controlled so as to prevent application of too little or too much solvent, resulting in improper bonding of the tubes into an assembly or erosion of the tubes comprising the assembly. Finally, the use of solvents is undesirable because residual solvents can be harmful to users of the assembly—particularly where the assemblies are used in the medical field for transporting therapeutic fluids.

Durakis et al., U.S. Pat. No. 3,316,134, discloses a different method for joining elongate plastic members. In this method, parallel elongate plastic members are run over a heater element and then compressed together by a pair of rimmed wheels to form a joining web. This method requires joining adjacent elongate plastic members along their entire lengths. This method also does not permit the simultaneous joining of multiple elongate plastic members. Moreover, this method is not suitable for joining hollow elongate plastic members such as intravascular tubes, because the tubes may become deformed when run through the rimmed wheels. This method is also not satisfactory for producing assemblies such as coils.

The present invention is directed toward overcoming one or more of the problems discussed above.

SUMMARY OF THE INVENTION

A method of making a peelable tube assembly includes providing at least one plastic tube having a wall defining a flow passage. One portion of a plastic tube is aligned adjacent to another portion of a plastic tube and the tube walls of the adjacent tube portions are plasticized. The plasticized portions of the tube walls are flowed into a mold between adjacent tube portions to fuse the adjacent tube portions together.

The aligning, plasticizing and flowing steps can be performed by providing a mold defining a plurality of parallel tube confining channels with a flow chamber defined by the mold between adjacent channels. A portion of a tube is placed in each channel. The tube wall of each portion of tube is compressed within a channel without occluding the flow passage of the tube portion. A section of adjacent tube portions proximate the chambers are plasticized, whereby plastic flows into the flow chamber to fuse adjacent tube portions together. The mold can include upper and lower dies made of a conductive material, each die having a leading surface with parallel grooves therein and land portions of the leading surfaces between the grooves. The parallel grooves and the land portions, with the leading surfaces in an operative position, define the channels and the flow chambers, respectively. The plasticizing is accomplished by applying an energy potential between the upper and lower dies by a radio frequency generator. The upper and lower dies are brought into an operative position by bringing the leading surfaces within about 0.010–0.014 inch from one another. The tube can have a cylindrical sidewall and the channels can have an elliptical cross-section. The tube portions can have a cross-section of a selected outer circumference and the channels can have a cross-section having an inner circumference of about 95 percent of the outer circumference of the tube portions.

Another aspect of the present invention is a peelable tube assembly made in accordance with the process described above. The tube assembly may be made of a single tube in a coiled configuration or a plurality of tubes joined in parallel.

Yet another aspect of the present invention is an apparatus for making an elongate plastic member assembly. The apparatus includes complementary upper and lower radio frequency dies, each die having a leading surface with a plurality of parallel grooves therein including a first and a last parallel groove. Adjacent parallel grooves of both dies are separated by a land strip of the leading surface. An outermost edge of the first and last parallel grooves of at least one of the upper and lower dies is beveled. Parallel grooves of the upper and lower dies, with the leading surfaces in an operative position, define a plurality of receiving channels and the land strips define a plurality of flow chambers. A press is provided for bringing leading surfaces of the upper and lower dies into an operative position in close proximity to one another. A radio frequency generator selectively applies an energy potential between the upper and lower dies to plasticize the elongate plastic members, whereby plastic flows into the flow chambers to fuse elongate plastic members together.

The apparatus can further include a plurality of projections radiating from the grooves of one of the upper and lower dies for guiding elongate plastic members into the grooves of the dies.

DETAILED DESCRIPTION OF THE PREFERRED EMBODIMENT

Figure 1:
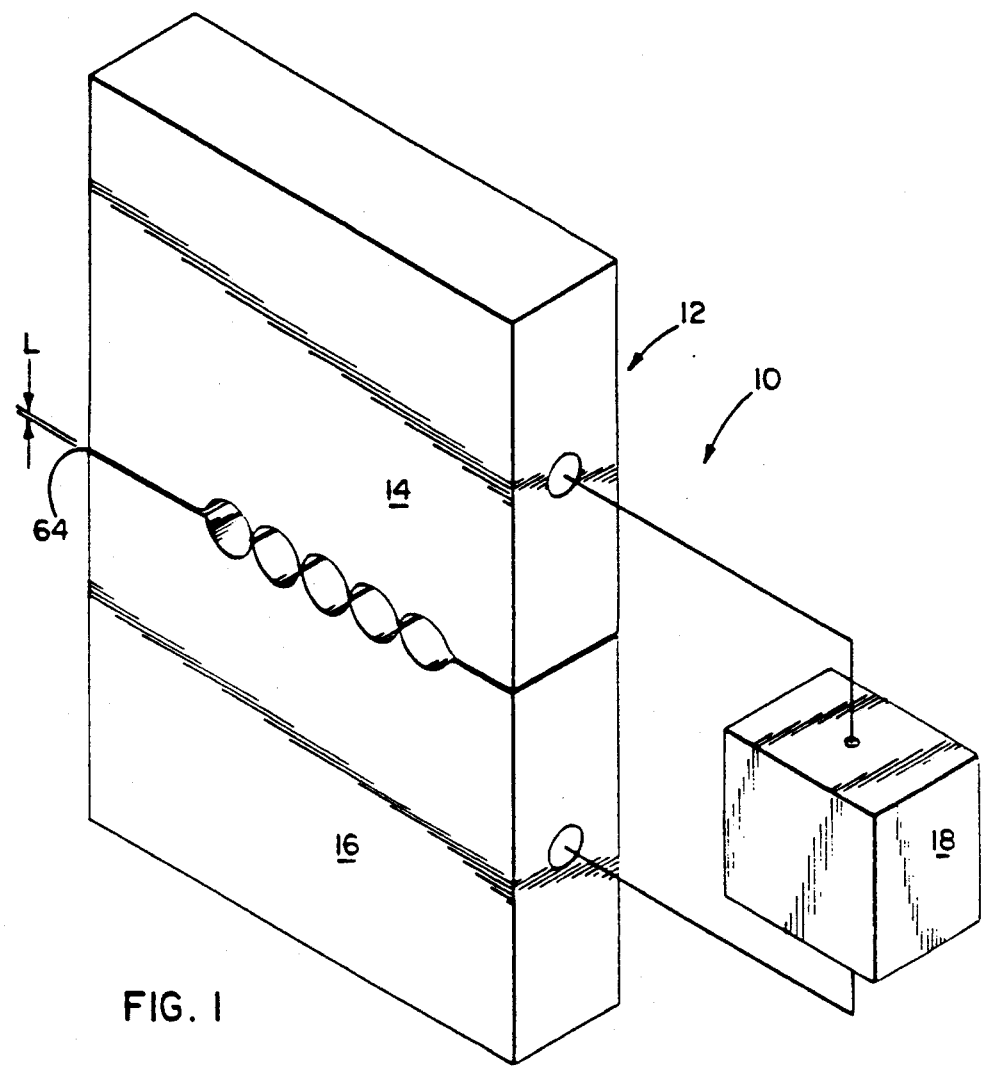
FIG. 1 is a perspective block diagram of an apparatus for making an elongate plastic member assembly including a pair of dies in accordance with the present invention.

FIG. 1 illustrates an apparatus 10 for making an elongate plastic member assembly including a die assembly 12 consisting of an upper die 14 and lower die 16. A radio frequency generator 18 provides a radio frequency signal to the upper and lower dies 14, 16.

Figure 2:
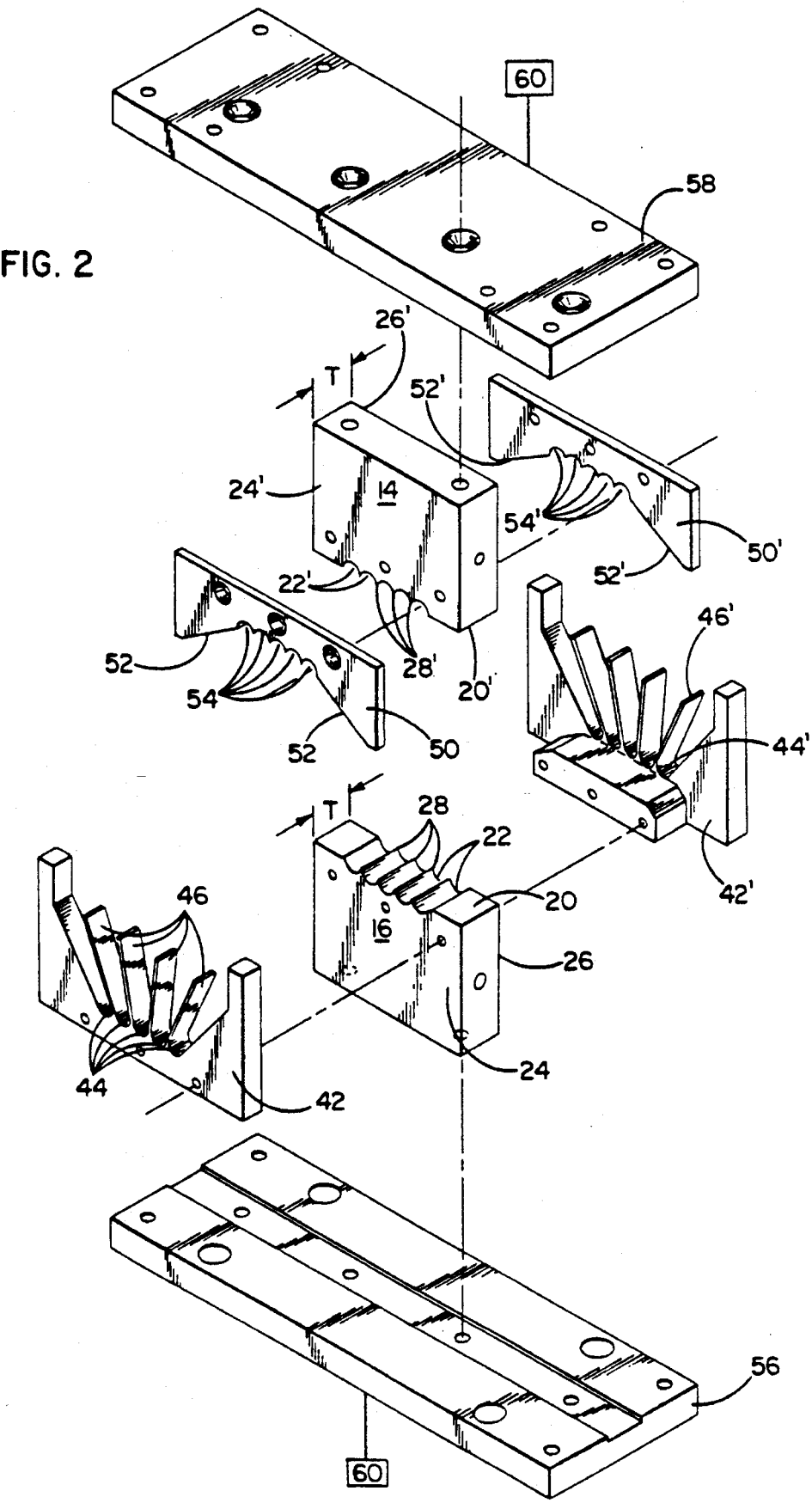
FIG. 2 is an exploded perspective view of the dies of FIG. 1.

FIG. 2 illustrates in detail the die assembly 12. A lower die 16 has a leading surface 20 having a plurality of parallel spaced apart grooves 22 therein. The grooves 22 extend from the front 24 to the back 26 of the lower die 16. Between each of the grooves 22 is a land strip 28 consisting of a narrow strip of the leading surface 20. The upper die 14 is identical to the lower die 16 with its channels, front and back surfaces and land strips indicated with the same reference numbers associated with the lower die 16, only including a prime. Both the upper and lower dies 14,16 have a thickness T of approximately half an inch and are made of brass.

Figure 3:
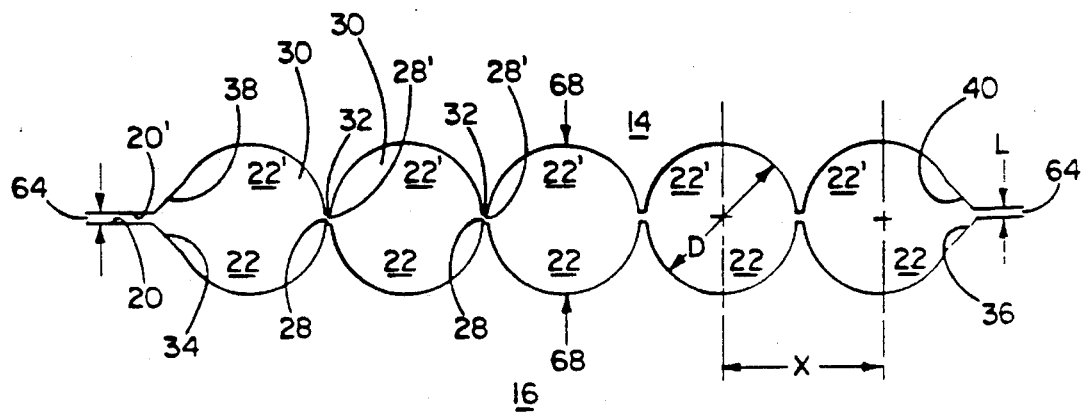
FIG. 3 is an enlarged front elevation view of the tube receiving grooves and flow channels of the die set of FIG. 1.

FIG. 3 is an enlarged view of the leading surfaces 20,20' of lower and upper dies 16,14 in an operative relationship. As seen in FIG. 3, complementary grooves 22, 22' of the lower and upper dies define a plurality of channels 30 and a plurality of flow chambers 32 are defined between each channel 30 by the land strips 28,28' of the lower and upper dies, 16,14 respectively. The outermost edges 34,36 and 38,40 of the grooves 22,22' of the lower 16 and upper 14 dies are beveled.

Attached to the front 24 of the lower die 16 is a guide 42 for facilitating insertion of elongate plastic members into the grooves 22 of the lower die 16. The guide 42 has a plurality of valleys 44, each corresponding to a groove 22 of the lower die 16. A plurality of angular projections 46 radiate from between the valleys 44. A guide 42' having valleys 44' and angular projections 46' identical to those of the guide 42 is attached to the back 26 of the lower die 16.

Attached to the front 24' of the upper die 14 is a front tube aligner 50. The front tube aligner 50 has inclined tube directing surfaces 52 for directing tubes loaded between the angular projections 46 of the guide 42 into the valleys 44 of the guide 42 and a corresponding slot 54 of the front tube aligner 50 as the upper die 14 is brought into an operative relationship with the lower die 16 wherein the leading surfaces 20,20' are in close proximity. A back tube aligner 50' is attached to the back surface 26' of the upper die 14 and is identical to the front tube aligner 50, with like elements indicated with the same reference numerals having a prime.

The lower die 16 is attached to a lower base plate 56 and the upper die 14 is attached to an upper base plate 58. The upper and lower base plates 56,58 in turn are attached to a press 60 for bringing the upper and lower dies 14,16 into and out of an operative relationship and for applying a compressive force to tube segments in the channels 30.

The apparatus for making an elongate plastic member assembly 10 can be used to make assemblies of elongate plastic members having any variety of cross-section configurations, whether hollow or solid, simply by having the channels 30 define a corresponding cross-section. Because of the special need in the medical field for an apparatus for making peelable tubular assemblies, the following discussion will focus upon the use of the apparatus 10 with plastic tubes, but this specific discussion should not be read as a limitation on the scope of the disclosure or claims.

Figure 7:
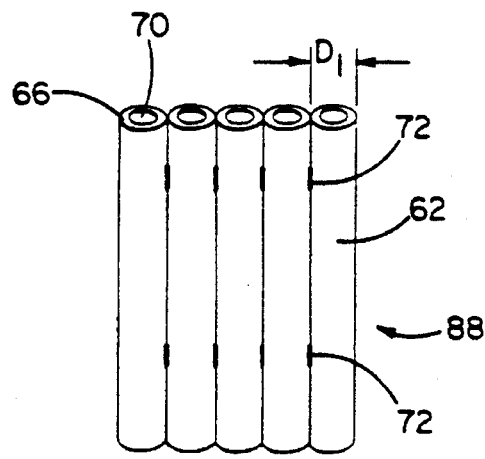
FIG. 7 is a fragmentary plan view of a plurality of parallel tubes made into a tube assembly according to the present invention.

The apparatus 10 is used by providing at least one plastic tube 62. Where the structure of FIG. 7 is desired, a plurality of plastic tubes 62 are used. Each plastic tube 62 to be joined is inserted into a separate groove 22 of the lower die 16. Insertion of the tubes 62 is facilitated by the front and back guides 42,42'. A user need only insert a tube 62 between each of the angular projections 46,46' and when the upper and lower dies 14,16 are brought into an operative position illustrated in FIG. 3 by the press 60, the front and back tube aligners 50,50' will cooperate with the front and back guides 42,42' to direct the plastic tubes 62 into the grooves 22.

When the press 60 is caused to bring the leading surfaces 20,20' of the lower and upper dies 16,14 into an operative relationship, a small gap 64 having a length L is maintained therebetween. The channels 30 have an inner diameter D slightly smaller than an outer diameter D1 of the tubes 62. In this manner, as the lower 16 and upper 14 dies are brought into an operative position, the tubes 62 are compressed within the channels 30 between the lower 16 and upper 14 dies. When the upper and lower dies are brought into close proximity, the gap of length L is established therebetween. The radio frequency generator 18 then provides radio frequency signals to the spaced lower and upper dies 16,14. The signals from the radio frequency generator cause melting of the side walls 66 of the tubes 62 in the vicinity of the flow channels 30. This melting combined with the compression causes the tube side walls in the vicinity of the flow chambers 32 to be extruded into the flow chambers 32 and fused to the side walls of or "heat-staked" to adjacent tubes.

It should be understood that the term "melt" used herein is intended to mean the state of the thermoplastic material where it plasticizes and cross-linking between adjacent tubes occurs in the chambers 32.

The beveled edges 34,36 and 38,40 of the outermost grooves 30 of the lower and upper dies 16,14, respectively, maintain the upper and lower dies sufficiently spaced in the vicinity of the tube wall that current from the RF generator cannot flow between the upper and lower dies. In this manner, melting of the tube walls in the vicinity of these beveled edges is prevented and the tube walls do not flow into the gap 64, preventing unsightly seams from forming on the outermost tubes.

During compression of the tubes 62 between the lower and upper dies 16,14, the compressive force illustrated by the arrows 68 is not so great as to cause the tube side walls 66 to collapse and occlude the tube flow passages 70. Likewise, upon melting of the tube side walls 66 in the vicinity of the flow channels 32 of the flow passages 70 are not occluded.

In a particular embodiment of the die assembly 12, the channels 30 have a diameter D of 0.238 inches with the center line of the channels being a distance X of 0.25 inches apart, leaving a land portion of 0.012 inches between adjacent channels. Tubes having outer diameters $D_1$ of 0.250 inches are inserted into the groove and subjected to the compressive force 68 by the press 60 bringing the lower and upper dies 16,14 into abutment with a gap 64 having a length L of between 0.01 and 0.014 inches. A thicker web 72 can be achieved by increasing the gap 64 length L and a thinner web achieved by decreasing the gap 64 length L.

In another specific embodiment of the apparatus, the die channels 30 have an inner diameter D of 0.220 inches on a channel center line of a length X of 0.23 inches. Tubes having an outer diameter $D_1$ of 0.23 inches are inserted into the grooves 22. A gap 64 having a length L of between 0.01 and 0.014 inches is created by the press 60.

In yet another embodiment of the apparatus, the die channels 30 have an inner diameter D of 0.136 inches on a channel center line of a length X of 0.142 inches. Tubes having an outer diameter $D_1$ of 0.14 inches are inserted into the grooves 22. Again, a gap 64 having a length L of between 0.01 and 0.014 inches is created by the press 60.

An exemplary RF generator 18 found to generate an appropriate radio frequency field for plasticizing the tube walls in each of the above examples is a Callanan Model No. 20. The following settings gave desired fusings in the flow chambers with a polyvinylchloride (PVC) tube:

| | | |
|---|---|---|
| GRID No. | 4 | |
| Heat No. | 10 | |
| Time | 1 second | |

It is observed from the above examples that the best results are achieved when the tube diameter (or circumference) is approximately five percent greater than the diameter (or circumference) of the channels 30.

Figure 8:
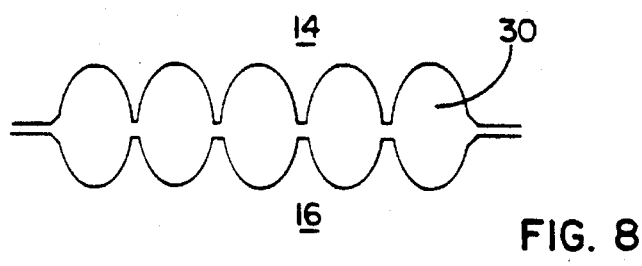
FIG. 8 is a front elevational view of an alternate embodiment of the tube receiving grooves and flow channels of the die set of FIG. 1.

Testing has shown that when plastic tube assemblies are made in accordance with the above-described embodiments, the thickness of the tube wall 66 in the area of the web 72 increases somewhat, presenting a slight occlusion to the flow passages 70. In some instances, this thickening of the side walls is desirable, as it reinforces the tube sidewalls in the vicinity of the webs and decreases the likelihood of the tube sidewall tearing upon severing of the web 72. In some instances, this partial occlusion is deemed undesirable. The occlusion can be avoided by defining channels 30 having a slightly elliptical cross-section, as illustrated in FIG. 8. Use of this slightly elliptical cross-section has been found to produce tubes having uniform wall thickness in the vicinity of the webs.

Figure 4:
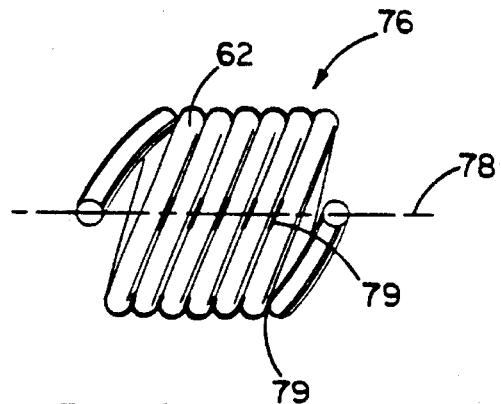
FIG. 4 is a front elevation view of an axially coiled tube assembly made in accordance with the present invention.

FIGS. 4–7 illustrate different embodiments of plastic tubular assemblies which can be made using the apparatus 10 of the present invention. FIG. 4 is a axially coiled tube assembly 76 coiled about the axis 78. The axially coiled assembly 76 is made by inserting each coil to be joined in a different channel 30 and then proceeding as described above. The best results are achieved when the axially coiled assembly 76 is rotated about the axis 78 a selected distance and the heat staking procedure is repeated to provide a number of circumferentially spaced webs 79.

Figure 5:
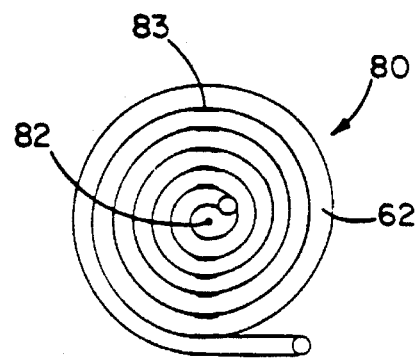
FIG. 5 is a plan view of a radially coiled tube assembly made in accordance with the present invention.

A radially coiled assembly 80 coiled about the axis 82 is illustrated in FIG. 5. As described with respect to the axially coiled assembly 76, each coil is inserted into a channel 30 and the heat staking process described above is followed to join adjacent coils by the web 83.

Figure 6:
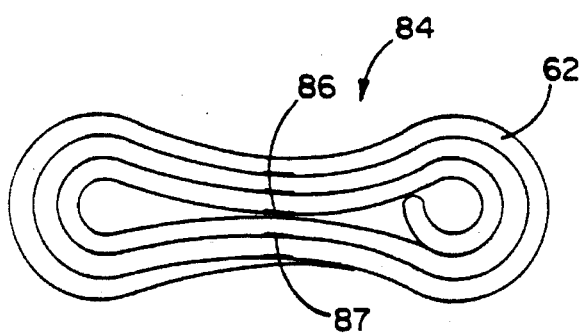
FIG. 6 is a plan view of a bow tie tube assembly made in accordance with the present invention.

FIG. 6 illustrates a bow tie tubular assembly 84 which is made by compressing the radially coiled assembly 80 transverse of the axis 80 at its center portion 86 and then heat staking the center portion 86 to form the webs 87 in the manner discussed above.

FIG. 7 illustrates a parallel tube assembly 88 wherein a plurality of parallel tubes 62 are joined in a parallel abutting relationship. The heat staking process described above is repeated at selected intervals along the length of the tubes 62 so as to provide intermittent webs 72 joining the tubes 62.

The apparatus and method for making elongate plastic member assemblies of the present invention provides significant cost savings over extrusion techniques. In addition, the apparatus and method permits the manufacture of coiled tube assemblies not possible using extrusion techniques. The apparatus and method also eliminate the need for using hazardous solvents for joining tube assemblies. The apparatus and method have the further advantage of eliminating seams on outermost tubes of a tube assembly. A parallel tube assembly made by the method of the present invention is inexpensive to manufacture and separation of a tube from the tube assembly is easier than when the tube assembly is made by extrusion or other continuous bond methods. Finally, tube assemblies made in accordance with the method of the present invention have no potentially harmful residual solvent deposits or unsightly seams on the outermost tubes.

I claim:

1. A method of making a peelable tube assembly having a plurality of adjacent tube portions joined by intermittent breakable webs of plastic allowing the individual portions to be peeled from the tube assembly, said method comprising the steps of:

(a) providing a plurality of plastic tube portions each having a tube wall defining a flow passage;

(b) aligning the tube portions adjacent to one another in a die assembly having compression channels;

(c) defining narrow confined flow chambers between adjacent compression channels and in between the ends of the tube walls;

(d) radially compressing the portions of the tube walls without occluding the flow passage;

(e) heating and plasticizing with RF energy while compressing small compressed portions of the tube walls proximate the flow chambers; and (f) flowing the plasticized tube walls portions into the flow chambers between the adjacent tube portions to fuse the adjacent tube portions together with intermittent webs joining the tubular portions until the webs are broken when peeling a tubular portion from the tube assembly.

2. The method of claim 1 wherein in step (a) a plurality of plastic tubes are provided and in step (b) the tubes are aligned in a parallel adjacent relationship.

3. The method of claim 2 wherein in step (e) the plasticizing and in step (f) the flowing are repeated at intervals lengthwise of the tubes between ends of the tubes to form a series of breakable webs between adjacent tube port ions.

4. The method of claim 1 wherein steps (b)–(f) are performed by:

provic a die assembly defining a plurality of parallel tube compression channels spaced parallel to one another with narrow flow chambers defined by the die assembly between adjacent channels;

placing a portion of a tube in each channel;

radially compressing the tube wall of each tube portion within the channels without occluding the flow passages of the tube portions; and heating and plasticizing with RF energy while compressing the adjacent tube portions proximate the narrow chambers whereby plastic flows into the narrow flow chambers to fuse adjacent tube portions together with intermittent webs between ends of the tube.

5. The method of claim 4 wherein:

said mold comprises an upper and a lower die made of a conductive material, each die having a leading surface with parallel grooves therein and land portions of the leading surfaces therebetween, the parallel grooves and the land portions, with the leading surfaces in an operative position, defining the channels and the flow chambers, respectively; and the plasticizing step comprises applying an energy potential between the upper and lower dies by a radio frequency generator.

6. The method of claim 5 wherein the flow chambers are defined by bringing the leading surfaces within about 10–14 thousandths of an inch from each other.

7. The method of claim 4 wherein the tube portions have a cylindrical side wall and the channels each have an elliptical cross-section.

8. The method of claim 4 wherein the tube portions have a cross-section of a selected outer circumference and the channels have a cross-section having an inner circumference of about 95% the outer circumference of the tube portions.

9. A method of making a peelable assembly of a plurality of elongate plastic members with the plastic members joined by intermittent plastic webs into the assembly, said method comprising the steps of:

(a) providing complementary upper and lower dies, each die having a leading surface with a plurality of parallel grooves therein for substantially covering peripheral surfaces of the plastic members, adjacent grooves being separated by a land strip of the leading surface, the dies, with the leading surfaces in an operative position, defining a plurality of compression channels substantially covering the entire peripheral surfaces of the elongate plastic members and the land strips defining a narrow flow chamber between adjacent channels;

(b) inserting an elongate plastic member into each of the compression channels;

(c) plasticizing with heat and pressure using RF energy portions of the elongate plastic members proximate the flow chambers; and (d) flowing the plasticized portions of the elongate plastic members into the narrow flow chambers to fuse adjacent elongate plastic members together with narrow breakable webs of plastic spaced intermittently along the assembly and peelable from the assembly with breaking of the webs.

10. The method of claim 9 wherein step (c) comprises applying an energy potential between the upper and lower dies by a radio frequency generator.

11. The method of claim 9 wherein step (d) further comprises compressing the elongate plastic members to extrude the plasticized portions of the elongate plastic members into the flow chambers.

* * * * *